Jan. 8, 1929.　　　　　　　　　　　　　　　　　　1,698,063
G. H. OHLAU
AVIATION CAMERA SHUTTER OPERATING MECHANISM
Original Filed Jan. 8, 1924　　　5 Sheets-Sheet 1
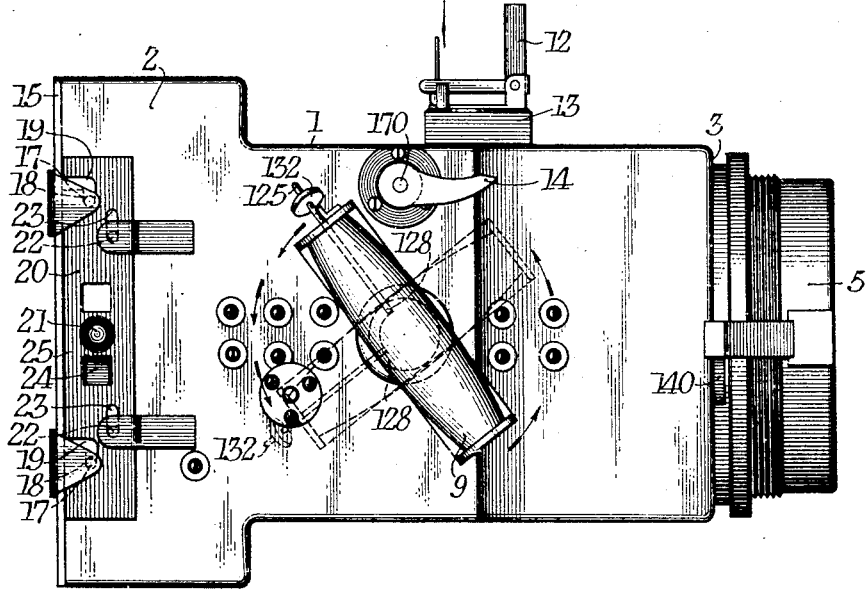
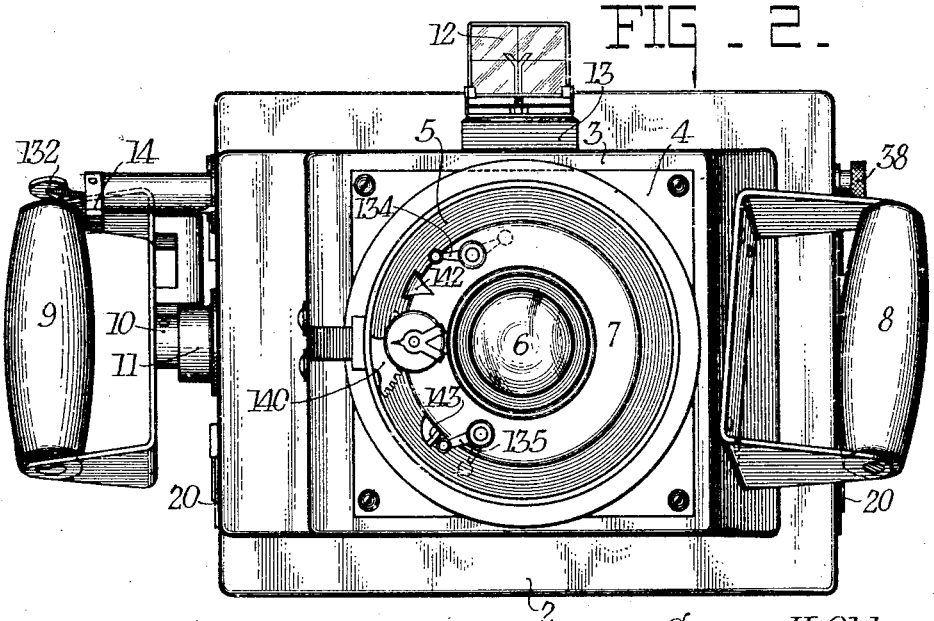
George H. Ohlau,
INVENTOR,
BY
ATTORNEYS.

Jan. 8, 1929.  1,698,063
G. H. OHLAU
AVIATION CAMERA SHUTTER OPERATING MECHANISM
Original Filed Jan. 8, 1924   5 Sheets-Sheet 2
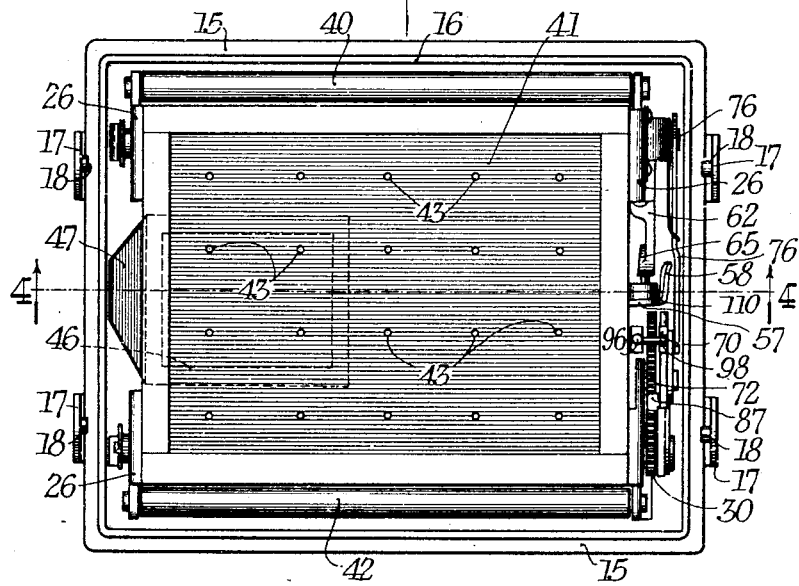
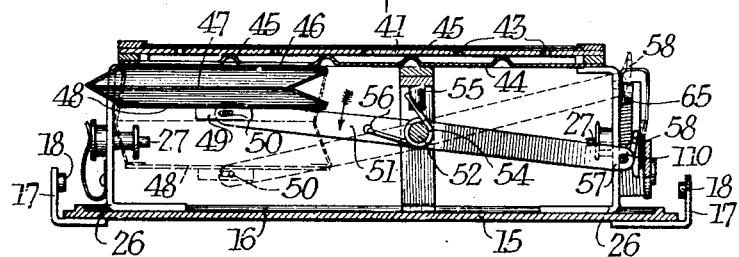
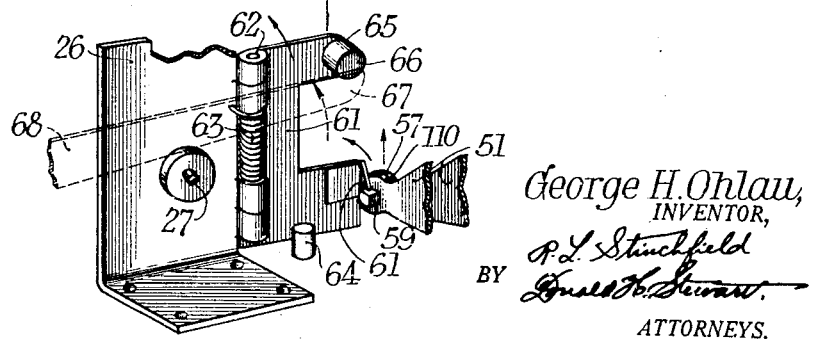
George H. Ohlau, INVENTOR,
BY
ATTORNEYS.

Jan. 8, 1929.     G. H. OHLAU     1,698,063
AVIATION CAMERA SHUTTER OPERATING MECHANISM
Original Filed Jan. 8, 1924     5 Sheets-Sheet 3
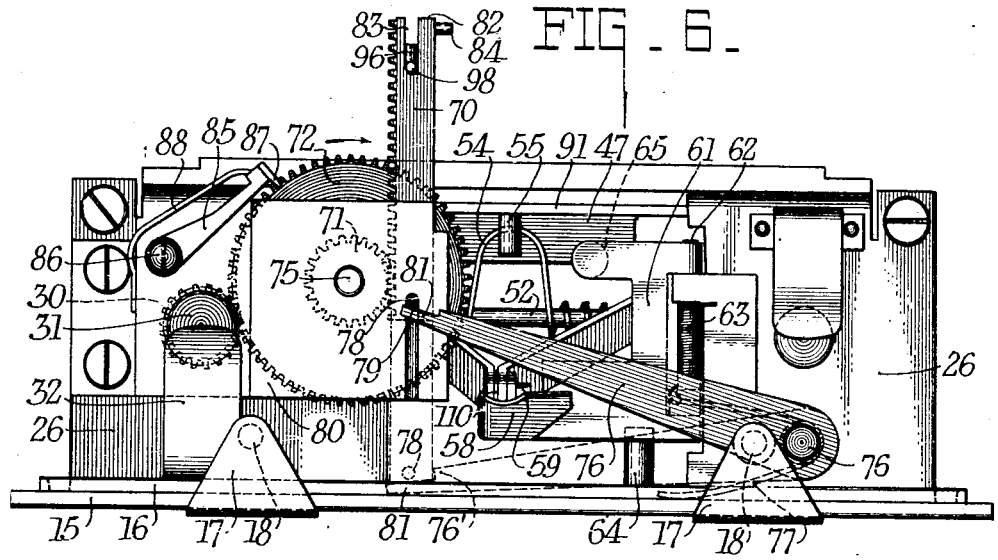
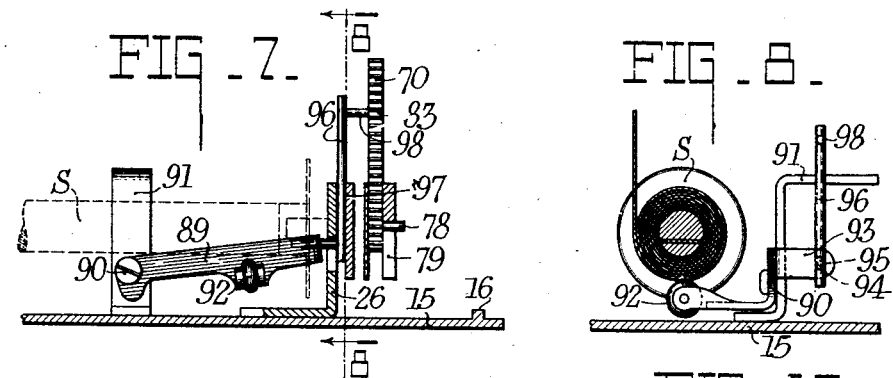
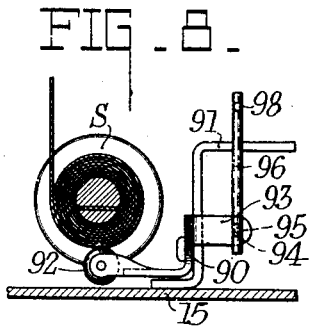
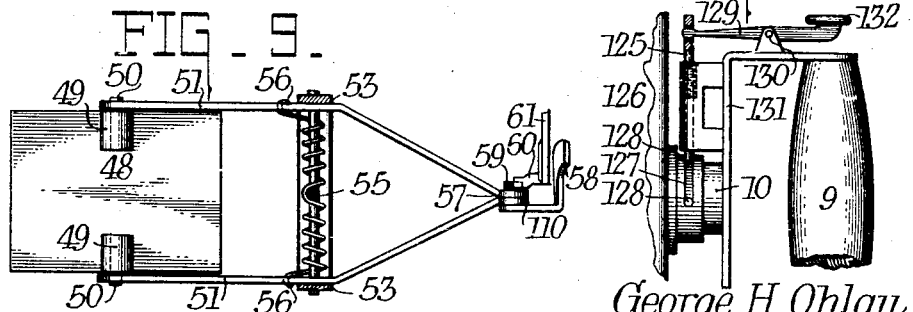
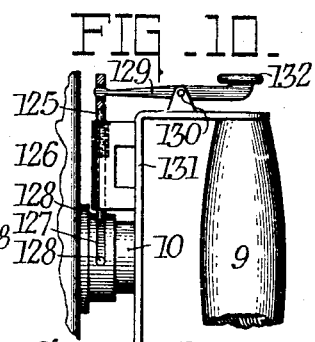
George H. Ohlau, INVENTOR,
BY
ATTORNEYS.

Jan. 8, 1929.
G. H. OHLAU
1,698,063
AVIATION CAMERA SHUTTER OPERATING MECHANISM
Original Filed Jan. 8, 1924   5 Sheets-Sheet 4
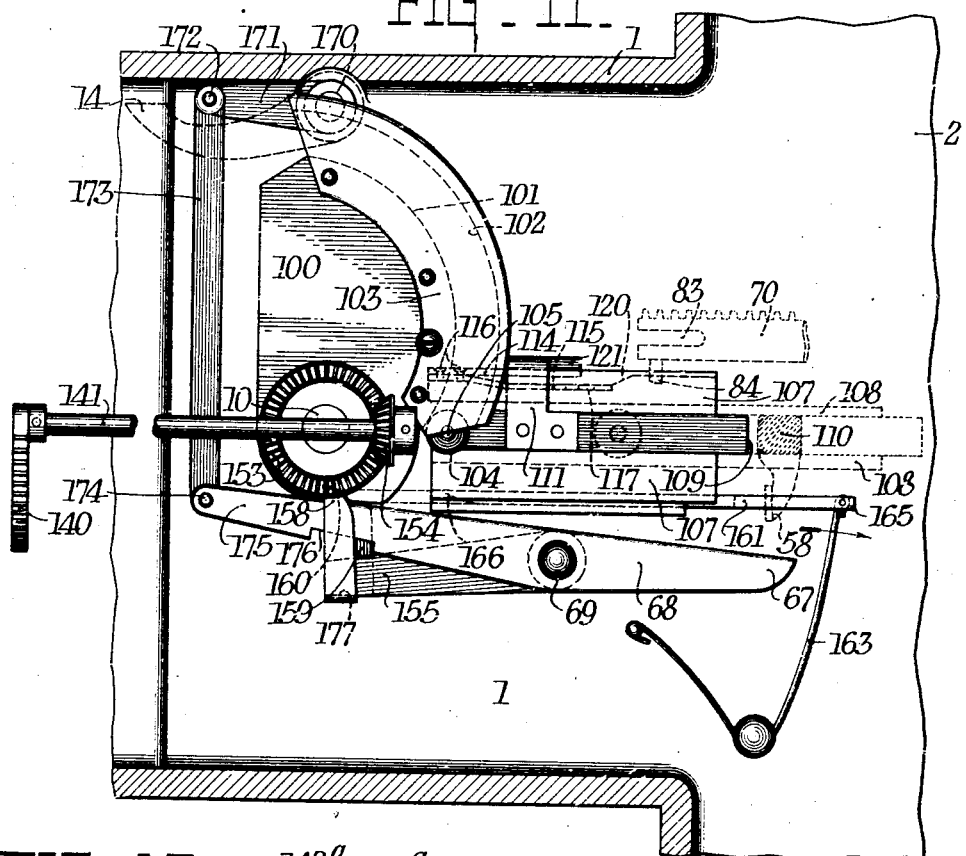
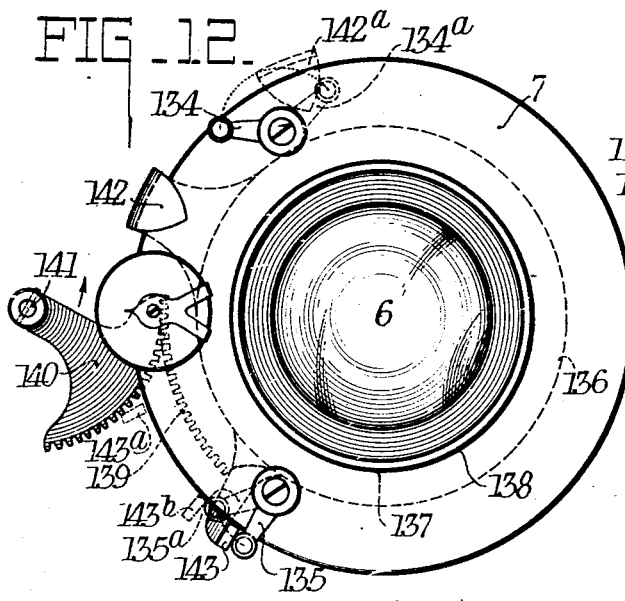
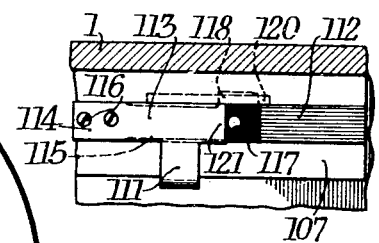
George H. Ohlau,
INVENTOR,
BY
ATTORNEYS.

Jan. 8, 1929.
G. H. OHLAU
1,698,063
AVIATION CAMERA SHUTTER OPERATING MECHANISM
Original Filed Jan. 8, 1924   5 Sheets-Sheet 5
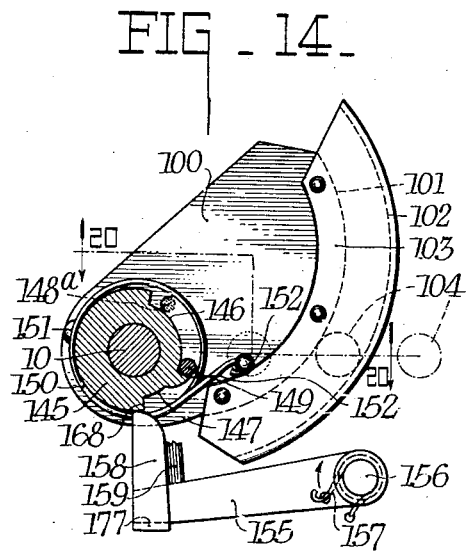
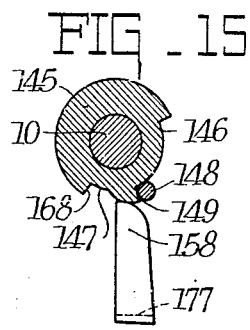
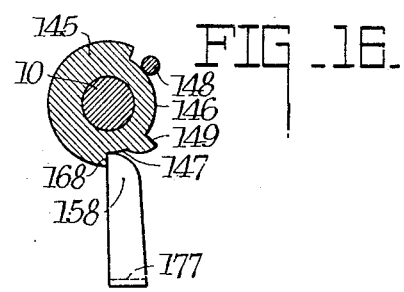
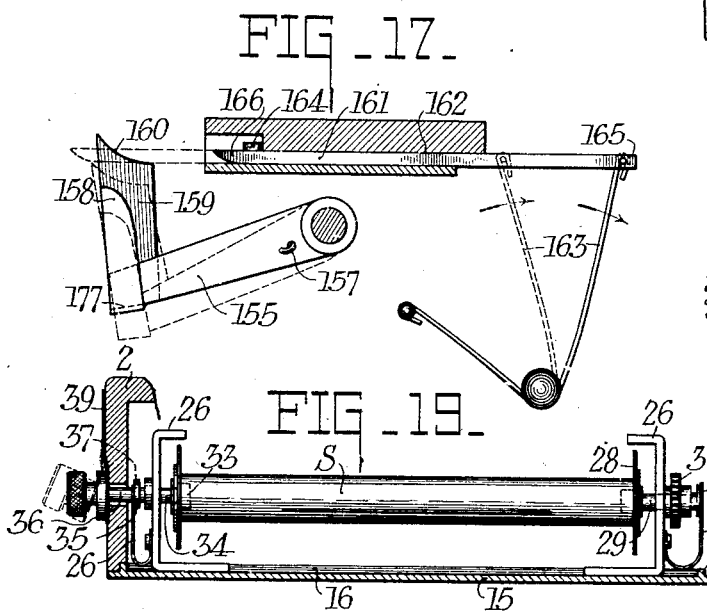
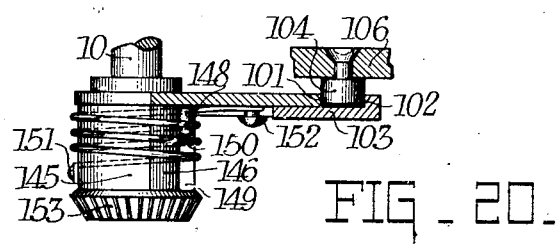
George H. Ohlau,
INVENTOR,
BY *R. L. Stinchfield*
*Ronald H. Stewart*
ATTORNEYS.

Patented Jan. 8, 1929.

1,698,063

UNITED STATES PATENT OFFICE.

GEORGE H. OHLAU, OF ROCHESTER, NEW YORK, ASSIGNOR TO EASTMAN KODAK COMPANY, OF ROCHESTER, NEW YORK, A CORPORATION OF NEW YORK.

AVIATION CAMERA-SHUTTER-OPERATING MECHANISM.

Original application filed January 8, 1924, Serial No. 685,054. Divided and this application filed July 8, 1927. Serial No. 204,364.

This invention relates to photography, and more particularly to photographic cameras designed particularly for aviation photography. One object of my invention is to provide such a camera in which a series of exposures may be made rapidly; another object is to provide a camera having gripping handles for holding the camera and controlling the exposures, so that the camera may be operated without releasing the handles; another object is to provide means for setting and tripping the camera shutter through the handles; another object is to provide suitable connections between the handle and shutter for actuating the latter, and connections between the handle and other mechanism so the various parts may be operated through the handle in proper timed relation; and still another object is to provide a camera with two handles, one movable relative to the other to facilitate actuating the movable parts; and other objects will appear hereinafter from the specification, the novel features being particularly pointed out in the claims at the end thereof.

This application is a division from my original application for aviation cameras, filed Jan. 8, 1924, Serial No. 685,054, this application issuing into Patent No. 1,645,923, October 18, 1927.

In the drawings wherein like reference characters designate like parts throughout:

Fig. 1 is a side elevation of a camera constructed in accordance with and embodying one form of my invention;

Fig. 2 is a front elevation of the camera shown in Fig. 1;

Fig. 3 is a top plan view of the roll holder removed from the camera;

Fig. 4 is a section through the roll holder on line 4—4 of Fig. 3;

Fig. 5 is a fragmentary detail perspective view of the bellows lever latch;

Fig. 6 is an enlarged side elevation of the roll holder removed from the camera;

Fig. 7 is a fragmentary detail partially in section of the film measuring mechanism;

Fig. 8 is a fragmentary section through the film measuring mechanism shown in Fig. 7 taken on line 8—8;

Fig. 9 is a bottom plan view of the bellows operating lever;

Fig. 10 is a fragmentary elevation of the handle controlling latch;

Fig. 11 is an enlarged section through a portion of the camera showing the main driving cam with its associated mechanism;

Fig. 12 is a front elevation of the shutter showing the shutter setting and tripping ring;

Fig. 13 is a fragmentary plan, partially in section, showing the rack latch;

Fig. 14 is an elevation of the main driving cam showing also a portion of its associated mechanism;

Figs. 15 and 16 show, in section, different positions of the shutter controlling hub;

Fig. 17 shows the tripping bar and its relation to the hub latch;

Fig. 18 is a side elevation of a portion of the film-driving gears;

Fig. 19 is a fragmentary section showing the take-up film spool in operative position; and Fig. 20 is a section on line 20—20 of Fig. 14.

This camera may be held by the handles on each side of the body and an exposure may be made by pressing the release which is close to one handle. The film can then be wound and the shutter set by turning the handle from the position shown in full lines in Fig. 1 to the position shown in dashed lines. This operation also places the bellows operating lever under tension so that it may be tripped to flatten the film just before the shutter is tripped.

The camera consists of a main casing 1 having an enlarged end 2 in which the roll holder is mounted and having a front 3 which supports a lens board 4. The protecting sleeve 5 is carried by the lens board and supports, inside of the sleeve, a lens 6 mounted in a shutter 7.

The shutter is of the between-the-lens type which requires setting before an exposure is made. A number of shutters of this type are now on the market.

Handles 8 and 9 are supported on the sides of the camera, handle 9 being mounted upon a shaft 10 passing into the bearing 11 mounted on the side of the camera. A finder 12, preferably of the folding direct view type, may be mounted upon a block 13 on the top wall of the camera casing 1. There is an operating lever 14 mounted above handle 9 in a position in which it can be operated by one finger of a hand which is supporting the camera through handle 9.

The camera back consists of a removable plate 15 having a light tight connection with the camera body 1 through the flanges 16. This back carries two pairs of flanges 17 from which pins 18 extend inwardly into a position in which they will engage the bayonet latch 19 of the plates 20 which can be slid by the finger grip 21 upon the pins 22 which pass through slots 23 in these plates. Each plate may be held in a locking position by means of a leaf spring 24 engaging an opening 25 in the plate.

The roll holder, film-winding mechanism and film-flattening mechanism are all mounted upon plate 15. A supply reel of film is carried by brackets 26 which support spool centering pins 27. A take-up spool S (Fig. 19) is carried by a second pair of brackets 26 similar to the first pair, the spool being carried by the webs 28 and 33 which engage in slots in each end of the spool. Web 28 forms a part of shaft 29 which may be revolved through gear 30. The web may be withdrawn from the spool by means of the knob 31 which is normally held toward the spool by spring 32. Web 33 is attached to shaft 34 which terminates in a slotted head 35, this member being pressed by spring 26' toward the spool S. Shaft 36 has a web 37 which engages the slotted head 35 when the knob 38 is in the position shown in full lines in Fig. 19. A spring 39 normally holds it in this position.

Film is led from the supply spool over roller 40 (Fig. 3) across plate 41 over roller 42 after which it is wound up upon spool S. Plate 41 has a series of perforations 43. There is an air chamber beneath this plate formed by a second plate 44 spaced from plate 41 by means of a series of formed-up knobs 45, (Fig. 4). There is an opening 46 in plate 44 leading to a bellows 47 which carries a bottom plate 48. This plate carries a pair of bearings 49 into which pins 50 of the levers 51 pass. Levers 51, as best shown in Fig. 9, turn about a shaft 52 carried by supports 53 being normally turned by a strong spring 54 in the direction indicated by the arrow, Fig. 4. This spring engages a pin 55 in the middle of the spring and the side arms 51 at the ends of the spring 56. The ends of the lever arms 51 come together at 57 and support an extended hook 58 and a latch pin 59. The side arms just described form a bellows operating lever. When this lever moves from the position shown in full lines, Fig. 4, to that shown in dashed lines air will be drawn through apertures 43 of plate 41 thus momentarily sucking the film flat against the plain surface of plate 41.

The latch pin 59 of the bellows operating lever may be held against the pressure exerted by spring 54 by means of the latch 61 which is carried by a hinged member 61'. This member is hinged to one of the brackets 26 by means of a pintle 62 about the central part of which there is a coiled spring 63 which will turn segment 61 into engagement with a pin 64 carried by plate 15. There is a pin 65 mounted upon segment 61' and having a slightly beveled face 66. This portion is engaged by the end 67 of a lever 68 pivoted at 69 to a camera wall, as is shown in Fig. 11. When lever 68 is moved to elevate end 67, this end will strike pin 66 moving segment 61' in the direction shown by the arrow, Fig. 5, thus releasing pin 59 from latch 61 and causing the bellows to function.

The roll holder film-winding mechanism (Fig. 6) consists of a rack 70 meshing with a small gear 71 which drives a large gear 72 in one direction only through the one-way clutch shown in Fig. 18. This comprises the well known clutch formed by rollers 73 operating in cam slots 74 so as to rotate shaft 75 when the rack is moved downwardly and so as to release shaft 75 when the rack moves in the opposite direction. This rack is normally held in the raised position, shown in Fig. 6, by means of a lever 76 pivoted at 76' to a bracket 26 and being normally thrust upward by a spring 77. A pin 78 on the rack passes through slot 79 in plate 80 and engages the end 81 of lever 75. The upper end 82 of rack 70 is slotted at 83 and carries a pin 84 which engages a portion of the rack reciprocating mechanism which will be hereinafter described. A pawl 85 pivoted at 86 to plate 80 has a tooth 87 pressed into engagement with the teeth of gear 72 by means of a spring 88. This pawl permits gear 72 to be driven in the direction shown by the arrow and prevents it from moving in the opposite direction.

After the film is wound upon the take-up spool S the diameter of the convolutions of film gradually increase so that it is necessary to turn the spool S through a smaller angle for each successive exposure area of film positioned on plate 41. To care for the varying diameter of the take-up spool the following mechanism, best shown in Figs. 7 and 8, is used: Lever 89 pivoted at 90 to a support 91 carries a roller 92 which contacts with the outermost convolutions of film wound upon the spool S. Lever 89 has a branch 93 slotted at 94 to receive a pin 95 extending from lever 96, this lever being slidably mounted in a bearing 97. A second pin 98 extends from member 96 into slot 83 of the rack 70. As the convolutions of film move the roller 92 toward plate 15 pin 98 is moved also towards plate 15 thus forming a stop which prevents the rack 70 from moving to its upper limit of movement. This automatically shortens the throw of rack 70 and consequently causes it to move gears 71, 72 and 30 a shorter distance at each successive operation so that the proper amount of film will be wound into position for exposure at each actuation of rack 70.

All of the above described mechanism forms a part of the roll holder which is mounted upon plate 15. This can be removed in a unit from the camera body 1. I will now describe the mechanism carried by the camera body which furnishes the power to operate the various movable parts of the roll holder.

A single movement of handle 9 from the position shown in full lines to that shown in dashed lines, Fig. 1, winds up the film, sets the bellows operating lever and sets the shutter all in position for an exposure. This is referred to as the operative position for the various mechanisms.

The handle 9 is attached to shaft 10 and turns this shaft in its bearing 11. Referring to Fig. 11, a plate 100 is affixed to shaft 10 so as to move with it. This plate has a curved edge 101 which forms one side of a cam slot the other side being formed by a flange 102 formed over on the edge of plate 103 which is fastened to plate 100. A roller 104 is pivoted at 105 to a sliding bar 106 which is adapted to move between plates 107 upon rails 108. This roller is moved by the cam above described from the position shown in full lines to that shown in dashed lines when the handle 9 is moved through approximately 90°. The end 109 of bar 106 is adapted to contact with the knob 110 on the end of the bellows operating lever. When, therefore, the rack is reciprocated it will move the bellows operating lever against the tension of spring 54 to the set position shown in Fig 4.

One cycle of operations of bar 109, that is, one back and forth movement, is adapted to reciprocate the film-winding rack 70 through the following mechanism:

An arm 111 is attached to slide 109 extending upwardly from the slide and across to a guideway 112 (see Fig. 13). The enlarged end 113 of the arm 111 carries a plate 114 to which a spring arm 115 is attached by rivets 116. This spring arm extends beneath part 113 and has an aperture 117 adapted to engage the pin 84 of rack 70. One side 118 of this spring extends beneath one side of the guideway 112 in a position to engage a cam 120. When part 106 is moved from the position shown in full lines in Fig. 11 the lug 118 permits the spring member 115 to ride upon the cam 120 into a position in which it will engage pin 84. In this way pin 84 is engaged only during the end of the reciprocation of the slide 106.

The reason for this short engagement with pin 84 is that when the rack 70 has been moved to its innermost position to wind up the film by means of the abutment 121 striking the pin 84 it must then be returned to its outer limit of movement which is determined by the stop pin 98. This is normally accomplished by a spring 77 which presses upon arm 75 causing it to contact with pin 78. However, it is better to positively start the rack moving outwardly so as to assist spring 77 in starting the movement of the rack. As the aperture 117 engages pin 84 at one extremity of its movement it positively starts the rack bar on its return movement when the roller 104 is drawn toward shaft 10 by means of handle 9. It should be noted that this movement will not interfere with pin 98 stopping the rack bar 70 at the desired position because the spring arm 115 is cammed down out of engagement with pin 84 by means of cam 120 before the rack can come to a stop against pin 98.

In order to hold the operating handle 9 (see Fig. 10) in either extremity of its movement there is a latch bar 125 which is normally pressed downwardly into a slot 127 by means of a spring 126. At each end of this slot there is an aperture 128 (only one being shown) into which the bar 125 may drop to hold the handle stationary. This bar can be moved from locking engagement with an aperture 128 by means of lever 129 fulcrumed at 130 to the handle support 131 and having an operating button 132 positioned above the end of the handle. This position makes it possible for an operator to readily press the button 132 with his thumb while retaining a firm grip on the handle 9.

As before described the shutter 7 is of the well known setting type in which the setting lever 134 must be moved from the position shown in full lines, Fig. 12, to the position shown in dashed lines at 134ª. This tensions the main shutter driving spring. In order to release the shutter, lever 135 must be moved from position 135ª (position shown in dashed lines) to the position shown in full lines. With this shutter a second exposure can not be made unless the shutter is again set. In order to set the shutter and in order to trip the shutter to make the exposure there is a ring 136 mounted so as to be movable about the rear lens barrel 137, this barrel being an extension from the rear of the shutter similar to the lens barrel 138 which extends outwardly from the front of the shutter. Ring 136 carries a gear segment 139 which meshes with a gear segment 140 which is keyed to shaft 141. This shaft is turned through approximately 40° periodically when the handle 9 is turned by a mechanism which will be hereinafter described. Ring 136 carries a setting lug 142 which is moved from the position shown in full lines to the position shown in dashed lines at 142ª. In order to trip the shutter, ring 136 also carries a tripping lug 143 which moves between the stations indicated by the dashed lines at 143ª to the position shown in full lines in which position the shutter has just been tripped. When the gear segment 40 is moved in the direction of the arrow the shutter is set and when it is moved in a reverse direction the shutter is tripped.

The shutter setting mechanism is operated by means of handle 9 in the following manner: Referring to Fig. 14 the shaft 10 is affixed to turn with handle 9. A drum 145 is mounted to turn freely upon shaft 10 and is provided with cut-out portions 146 and 147. A pin 148 carried by plate 100 which is fixedly attached to shaft 10 moves through cut-out portion 146 being adapted to strike the lug 149 near the end of its cycle of movement. Pin 148 moves drum 145 through approximately an angle of 40° the extremities of movement of drum 145 being shown in Figs. 14 and 15. For the rest of the movement of handle 9 the pin moves freely in the cut-out 146 its normal position of rest being shown in full lines at 148. A spring 150 is attached to the drum at 151 and to plate 100 at 152. This spring tends to move lug 149 towards pin 148. Referring to Figs. 11 and 20 drum 145 carries a gear 153 on its outer end, this gear meshing with a second beveled gear 154. Gear 154 is pinned to shaft 141 so as to operate the shutter setting and tripping ring above described through gear segments 140 and 139.

There is a drum latch 155 hinged to the camera at 156 and having a spring 157 which moves the latching member 158 towards the shaft 10. A tripping member 159 is also attached to lever 155 and is provided with a cam face 160 (see Fig. 17) which is in the path of a trip bar 161. This bar moves through a slideway 162 being held by a light spring 163 in the position shown in full lines, a screw 164 limiting its movement in one direction. When, however, the end of the trip bar 165 is engaged by hook 58 which forms a part of the bellows operating lever 51 it is moved from the position shown in full lines to that shown in dashed lines, Fig. 17. This movement causes the curved end 166 to engage cam 160 thus moving lever 155 against the pressure of spring 157 and lowering the latch member 158 from the drum.

Assuming the camera has been set and is in position for exposure the drum 145 will be in the position shown in Fig. 16 wherein latch 158 lies inside of notch 147 engaging the lug 168. In this position the handle 9 is latched in the position shown in full lines in Fig. 1. When lever 14 is depressed through a mechanism, which will be hereinafter described, hook 58 strikes the end 165 of tripping bar 162, thus lowering the drum latch 158 and permitting the drum 145 under the impulse of spring 150 to move to the position shown in Fig. 14. Spring 150, therefore, furnishes the power for moving shaft 141 and the shutter operating ring 136 to the position shown in full lines in Fig. 12. As the shutter exposure lever 135 cannot be moved beyond this position it provides a stop which limits the movement of drum 145 under the influence of spring 150. The exposure has now been made. Handle 9 is turned and towards the latter part of its movement pin 148 will strike stop 149 and move the drum from the position shown in Fig. 14 to the position shown in Fig. 15. The latch having already returned to its initial position releases lever 155 and permits latch 158 to again rest against the drum 145. When the parts are in the position shown in Fig. 15 the ring 136, Fig. 12, is in position to set the shutter and the setting lug 142ª and the tripping lug 143ª are in the position shown in the dashed lines in that figure. When the handle returns it will be noted that the latched lug 158 engages stop 168, thus preventing drum 145 from returning to the position shown in Fig. 14. In this position the tripping lug (Fig. 12) will be in the dot and dash line position 143ᵇ in which it contacts with the tripping lever 135. When latch 158 releases stop 168 the drum moves from the position shown in Fig. 16 to that shown in Fig. 14, moving the tripping lug from the position at 143ᵇ to the position shown in full lines at 143, thus actuating the shutter. The tripping mechanism will now be described. The tripping lever 14, which, as shown in Fig. 1, lies close to handle 9 so that it may be grasped by the first finger of an operator's hand while he still retains a firm grip on handle 9, is carried by a shaft 170. This shaft passes through the camera body 1 and carries a lever 171 to which there is pivoted at 172 a link 173. This link is pivoted at 174 to the end 175 of lever 68 which is pivoted at 69 to the camera body. This lever carries a cut-out 176 so that it will not strike the cross bar 177 of lever 155, (see Fig. 11). The end 67 of lever 68 engages the hinged segment 61 (Fig. 5) to trip the bellows operating lever 51 as this lever moves upwardly and completes its function by drawing the film flat against plate 41. The hook 58 by striking the tripping bar 162 releases the shutter to make an exposure at the moment that the film has been drawn flat in the focal plane.

It should be noted that the camera back plate 15 carrying the roll holder, the bellows mechanism and the film-winding rack and gears can be removed from the body portion of the camera by operating the two latch members 20 on each side of portion 2 of the camera body. All of the members on the roll holder which are actuated by members mounted in the camera body merely rest against each other and are not latched together. When the operating handle 9 is in the position shown in Fig. 2, the roll holder can be removed without disengaging these cooperating parts. This greatly facilitates loading and unloading the camera.

The complete operation of my camera is as follows: Starting with the parts in the position shown in Figs. 1 and 2, in which the shutter has been set and the bellows operating lever spring has been set, the operator may press upon release 14. This causes lever 68 to move about its pivot 69 through the force exerted by lever 171 and link 173. The end 67 of this lever then strikes the face 65 of pin 66 moving the hinged segment 61' so as to cause latch 61 to slip off pin 59. The bellows actuating lever 51 under the impulse of spring 54 will then draw the bellows down to the position shown in dashed lines, Fig. 4, drawing the film flat against plate 41 through the air suction created through the apertures 43 by the bellows 47. As the lever 51 moves the bellows the hook 58 on the end of this lever engages the tripping bar 162 moving it against its spring 163 into engagement with cam 160 lowering lever 155 and with it the latch 158 from drum 145. This movement permits the drum to turn under the impulse of spring 150 thus moving the shutter actuating lever 143 from the position shown in full lines in Fig. 2 to the position shown in full lines in Fig. 12. Thus an exposure is made during the moment the film is held flat by means of the suction. The parts are now in what I call their inoperative position.

In order to wind up a fresh area of film and in order to set the shutter and the bellows operating lever spring the camera operator depresses button 132 raising latch bar 125 from a notch 128 and permitting the handle 9 to be moved from the full line to the dotted line position as indicated in Fig. 1. This movement turns plate 100 and with it the cam slot formed by the plate edge 101 and the flange 102, thus causing roller 104 to move slide 106 from the position shown in full lines, Fig. 11, to that shown in dashed lines. During this movement the end 109 of the slide 106 will strike portion 110 of the bellows actuating lever 15 moving downwardly against the pressure of spring 54 until pin 59 of this lever is engaged by the spring latch 61. The bellows is now in the raised or set position shown in Fig. 4.

This outward movement of the slide 106 also causes part 121 to strike pin 84 of the film-winding rack bar 70. As this rack bar is moved downwardly against the pressure exerted upon pin 78 by means of lever 75 and spring 77 the pin 84 becomes latched into aperture 117 carried by spring 115. The downward movement rotates gears 71, 70 and 30 winding up the film. As the film gradually winds upon spool S roller 92 is depressed lowering bar 96 and with it pin 98 which projects into the path of the rack bar 70. As the handle 9 is being returned to its initial position rack bar 70 through pin 84 and the spring latch 115 will be started on its return movement. After a short travel spring 115 will release pin 84 as lug 118 strikes cam 120. This will permit the rack bar 70 to be moved entirely through the action of spring 77 and lever 75. The rack bar will move upwardly until it strikes the stop pin 98. Since this pin limits the movement of the rack and since it is controlled by the diameter of the film convolutions on spool S it automatically controls the distance through which the film-winding gears are moved. This automatically takes care of the varying diameter of the take-up spool so that the correct amount of film will be wound into the exposure position. The bellows has now been wound up and a fresh film area is in position for exposure.

The movement of handle 9 back and forth causes pin 148 to move drum 145 and with it beveled gears 153 and 154 so as to turn shaft 141 and with it gear segments 140 and 139, thus causing the ring 136 through the setting lug 142 to strike and turn lever 134 of the shutter 7 so as to set the shutter. The camera is now in readiness for a second exposure.

Although a description of the moving parts is necessarily long the movements necessary to make a series of exposures are actually very short and can be made by an operator without releasing his grasp upon the two handles 8 and 9 by which the camera is supported.

While I have illustrated, in the drawings, a preferred embodiment of my invention I do not wish to be limited to the structure shown in this embodiment and contemplate as within the scope of my invention all such modifications as may come within the scope of the appended claims.

Having thus described my invention what I claim as new and desire to secure by Letters Patent is,—

1. In an aviation camera, the combination with a camera body, of a shutter mounted at one end of the body and having a setting and a tripping lever, a ring mounted to turn about the shutter, a lug mounted on the ring and adapted to engage the setting lever when the ring is moved in one direction, and means for moving the ring.

2. In an aviation camera, the combination with a camera body, of a shutter mounted at one end of the body and having a setting and a tripping lever, a ring mounted to turn about the shutter, a lug mounted on the ring and adapted to engage the tripping lever when the ring is moved in one direction, and means for moving the ring.

3. In an aviation camera, the combination with a camera body, of a shutter mounted at one end of the body and having a setting and a tripping lever, a ring mounted to turn about the shutter in two directions, a lug mounted on the ring and adapted to engage the setting lever, a second lug mounted on the ring and adapted to engage the tripping lever, one lug at a time being brought into engagement with its lever by moving the ring in first one direction and then the other.

4. In an aviation camera, the combination with a camera body, of a shutter mounted at one end of the body and having a setting and a tripping lever, a ring mounted to turn about the shutter, a lug mounted on the ring and adapted to engage the setting lever, a second lug mounted on the ring and adapted to engage the tripping lever, one lug engaging one of said levers when the ring is turned in one direction, the other lug engaging the other lever when the ring is turned in the other direction, and means for moving the ring.

5. In an aviation camera, the combination with a camera body, of a shutter mounted at one end of the body and having a setting and a tripping lever, a ring mounted to turn about the shutter, two lugs on the ring, one arranged to strike the setting lever when moved in one direction, and the other arranged to strike the tripping lever when moved in the other direction, a spring connected to the ring to drive said ring in one direction, camera supporting handles on the camera body, one handle being movably mounted, connections between the movable handle and the ring for moving the latter by the former in one direction to set the spring, and means for tripping the spring to actuate the ring in the other direction.

6. In an aviation camera, the combination with a camera body, of a shutter mounted at one end of the body and having a setting and a tripping lever, a ring mounted to turn about the shutter, a lug on the ring arranged to strike the setting lever when moved in one direction, and another lug on the ring arranged to strike the tripping lever when moved in the other direction, a spring connected to the ring to drive said ring in one direction, camera supporting handles on the camera body, one handle being movably mounted, connections between the movable handle and the ring for moving the ring in one direction to set the shutter and the spring, and a tripping device to release said spring permitting said spring to drive the ring in the other direction to trip the shutter.

7. In an aviation camera, the combination with a camera body, of a shutter mounted at one end of the body and having a setting and a tripping lever, a ring mounted to turn about the shutter, a pair of lugs on the ring, one arranged to strike the setting lever when moved in one direction, and the other arranged to strike the tripping lever when moved in the other direction, a spring connected to the ring to drive said ring in one direction, camera supporting handles on the camera body, one handle being movably mounted, a lost motion connection between the movable handle and the ring whereby a portion of the possible movement of the movable handle will be transmitted to the ring, moving the ring to set the shutter, connections between said movable handle and said spring for setting the spring, and a tripping device for releasing the spring permitting the the ring to be driven to trip the shutter.

8. In an aviation camera, the combination with a camera body, of a shutter mounted at one end of the body and having setting and tripping levers, with mechanism adapted to engage these levers, a handle mounted on the camera having a limited movement relative thereto for supporting the camera, connections between the handle and the mechanism for engaging the shutter setting lever whereby said mechanism may be moved through the movable handle while supporting the camera therewith.

9. In an aviation camera, the combination with a camera body, of a shutter mounted at one end of the body and having setting and tripping levers each adapted to move in a fixed path, with mechanism for engaging these levers movable through a different path from that of the shutter setting and tripping levers, a camera supporting handle, a movable mount therefor, connections between the movable mount and the mechanism for engaging the shutter setting and tripping levers, whereby the latter may be moved by the former during a portion of the movement of the handle.

10. In an aviation camera, the combination with a camera body, of a shutter mounted at one end of the body and having a shutter setting lever, means for supporting the camera body including a movable handle, connections between said means and said setting lever for actuating the latter by the former.

11. In an aviation camera, the combination with a camera body, of a shutter mounted on said body, a setting member on said shutter, means for supporting the camera including a pair of spaced handles one movably mounted with respect to the other and connections between the camera supporting means and the shutter setting member whereby the latter may be actuated by turning one handle relative to the other.

12. In an aviation camera, the combination with a camera body, of a shutter mounted on said body, a setting member on said shutter, means for supporting the camera including a pair of spaced handles one movably mounted with respect to the other and connections between said movable handle and the setting lever for transmitting motion from the handle to the setting lever.

13. In an aviation camera, the combination with a camera body, of a shutter mounted on said body, a setting member on said shutter, means for supporting the camera including a pair of spaced handles one movably mounted with respect to the other and mechanism cooperating with the movably mounted handle and with the shutter lever for moving the latter to set the shutter when the handle is moved in one direction.

14. In an aviation camera, the combination with a camera body, of a shutter mounted on said body, a setting member on said shutter, means for supporting the camera including a pair of spaced handles one movably mounted with respect to the other and mechanism adapted to be moved by the movable handle and a lost motion connection between said mechanism and the shutter setting lever, whereby the latter may be moved by the mechanism through the handle when the handle moves in one direction.

15. In an aviation camera, the combination with a camera body, of a shutter mounted on said body, a setting member on said shutter, means for supporting the camera including a pair of spaced handles one movably mounted with respect to the other and mechanism adapted to be moved by the movable handle, and a lost motion connection between the movable handle and the shutter setting lever whereby the shutter setting lever may be moved by moving the handle in one direction and may remain stationary when the handle is moved in the other direction.

16. In an aviation camera, the combination with a camera body, of a shutter having setting and tripping levers thereon, mechanism for tripping the shutter including a spring means for tensioning the spring, said means also being adapted to tension the shutter setting lever, and mechanism under the control of the operator for releasing the shutter tripping mechanism.

17. In an aviation camera, the combination with a camera body, of a shutter having setting and tripping levers thereon, mechanism for tripping the shutter including a spring, a handle movably mounted on the camera for tensioning the spring, a lever on the camera for releasing the spring, and connections between said spring and said shutter for actuating the latter through the tripping lever.

18. In an aviation camera, the combination with a camera body, of a shutter having setting and tripping levers thereon, mechanism for tripping the shutter including a spring, a handle movably mounted on the camera for tensioning the spring, and the shutter setting lever, a tripping device for the spring, and connections between the spring and the shutter tripping device whereby the shutter tripping lever may be moved through the spring.

19. In an aviation camera, the combination with a camera body, of a shutter having setting and tripping levers thereon, mechanism for tripping the shutter including a spring, means for simultaneously tensioning the spring and the shutter setting lever, and means for releasing the shutter through the spring.

20. In an aviation camera, the combination with a camera body, of a shutter having setting and tripping levers thereon, mechanism for tripping the shutter including a spring, a handle movably mounted on the camera body, connections between the handle, spring and shutter setting levers for tensioning the spring and shutter setting lever through movement of the handle.

Signed at Rochester, New York this 2nd day of July 1927.

GEORGE H. OHLAU.